United States Patent
Imanaka

(10) Patent No.: US 9,277,612 B2
(45) Date of Patent: Mar. 1, 2016

(54) SWITCHING CONVERTER, CONTROL CIRCUIT AND CONTROL METHOD THEREOF, AND LIGHTING DEVICE AND ELECTRONIC APPARATUS USING THE SAME

(71) Applicant: ROHM CO., LTD., Ukyo-ku, Kyoto (JP)

(72) Inventor: Yoshinori Imanaka, Ukyo-ku Kyoto (JP)

(73) Assignee: ROHM CO., LTD. (JP)

( * ) Notice: Subject to any disclaimer, the term of this patent is extended or adjusted under 35 U.S.C. 154(b) by 0 days.

(21) Appl. No.: 14/505,878

(22) Filed: Oct. 3, 2014

(65) Prior Publication Data

US 2015/0098045 A1   Apr. 9, 2015

(30) Foreign Application Priority Data

Oct. 7, 2013  (JP) .................................. 2013-210244

(51) Int. Cl.
- H05B 33/08       (2006.01)
- G02F 1/1335      (2006.01)
- H02M 3/335       (2006.01)

(52) U.S. Cl.
CPC ...... H05B 33/0815 (2013.01); G02F 1/133603 (2013.01); H02M 3/33507 (2013.01)

(58) Field of Classification Search
None
See application file for complete search history.

(56) References Cited

U.S. PATENT DOCUMENTS

| | | | | |
|---|---|---|---|---|
| 8,749,149 B2* | 6/2014 | Naruo | ................ | H05B 33/0815 315/186 |
| 8,860,319 B2* | 10/2014 | Naruo | ................ | H05B 33/0818 315/186 |
| 2006/0170373 A1* | 8/2006 | Yang | .................. | H05B 33/0815 315/209 R |
| 2009/0289567 A1* | 11/2009 | Kobayashi | ............. | H05B 41/32 315/241 R |
| 2010/0052569 A1* | 3/2010 | Hoogzaad | .......... | H05B 33/0818 315/294 |
| 2011/0291590 A1* | 12/2011 | Lin | ..................... | H02M 1/4225 315/297 |
| 2012/0056548 A1* | 3/2012 | Duan | ................. | H05B 33/0815 315/200 R |
| 2012/0112645 A1* | 5/2012 | Lee | .................... | H05B 33/0818 315/186 |

(Continued)

FOREIGN PATENT DOCUMENTS

| JP | 2003-153529 A | 5/2003 |
|---|---|---|
| JP | 2004-47538 A | 2/2004 |

*Primary Examiner* — Crystal L Hammond
(74) *Attorney, Agent, or Firm* — Cantor Colburn LLP

(57) ABSTRACT

A control circuit of a switching converter includes a current detection comparator for comparing a detection voltage corresponding to a voltage drop of a detection resistor with a reference voltage and generating a peak current detection signal asserted when the detection voltage reaches the reference voltage, a driving logic unit for generating a pulse signal indicating a turn-on/off operation of a switching transistor and changing the pulse signal to an OFF level indicating the turn-off operation of the switching transistor when the peak current detection signal is asserted, a driver for driving the switching transistor based on the pulse signal, and a reference voltage setting unit for measuring time ($T_{RECT}$) for which a current flows through a secondary coil and a switching period (T) of the switching transistor and adjusting the reference voltage ($V_{REF}$) according to an equation: $V_{REF}=K \times T/T_{RECT}$ where K is a coefficient.

13 Claims, 8 Drawing Sheets

(56) References Cited

U.S. PATENT DOCUMENTS

| | | | |
|---|---|---|---|
| 2012/0242235 A1* | 9/2012 | Naruo | H05B 33/0815 315/186 |
| 2012/0262079 A1* | 10/2012 | Lin | H05B 33/0815 315/206 |
| 2013/0038236 A1* | 2/2013 | Mitarashi | H02M 3/156 315/240 |
| 2013/0134892 A1* | 5/2013 | Kado | H02M 3/33523 315/206 |
| 2013/0300315 A1* | 11/2013 | Lee | H05B 37/02 315/297 |
| 2014/0125246 A1* | 5/2014 | Sasaki | H05B 33/0803 315/224 |
| 2015/0245434 A1* | 8/2015 | Xu | H05B 33/0815 315/291 |

* cited by examiner

500a

500b

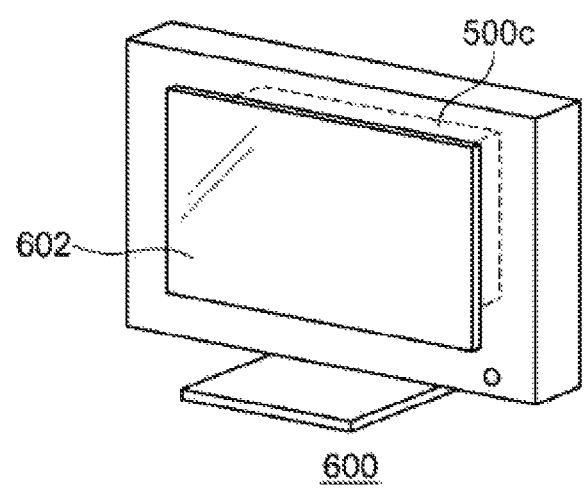

SWITCHING CONVERTER, CONTROL CIRCUIT AND CONTROL METHOD THEREOF, AND LIGHTING DEVICE AND ELECTRONIC APPARATUS USING THE SAME

CROSS-REFERENCE TO RELATED APPLICATIONS

This application is based upon and claims the benefit of priority from Japanese Patent Application No. 2013-210244, filed on Oct. 7, 2013, the entire contents of which are incorporated herein by reference.

TECHNICAL FIELD

The present disclosure relates to a switching converter.

BACKGROUND

A switching converter is used to step up or step down a DC voltage or convert a DC voltage into an AC voltage and vice versa. Various types of switching converters are available. Among these, there is a constant current-controlled switching converter for detecting a current flowing into a load and/or detecting a current flowing through a switching element of the switching converter and stabilizing the detected current to a predetermined value through a feedback control.

FIG. 1 is a circuit diagram of a flyback type switching converter. A switching converter 100r, to which an input voltage $V_{IN}$ from a power supply (not shown) is input, generates and supplies an output voltage $V_{OUT}$ to a load 502 by stepping down the input voltage $V_{IN}$ while stabilizing a current $I_{LED}$ (referred to as a load current or a driving current) flowing through the load 502 to a target current value $T_{REF}$. For example, the load 502 is a light emitting diode (LED) string and the switching converter 100r sets the load current $I_{LED}$ to the target current value $T_{REF}$ based on the target brightness of the LED string.

The switching converter 100r includes an output circuit 102 and a control circuit 200r. The output circuit 102 includes a smoothing capacitor C1, a rectifying diode D1, a switching transistor M1, a primary coil $L_P$, an auxiliary inductor $L_{ZT}$ and a detection resistor $R_{CS}$.

In an ON period of the switching transistor M1, a current flowing through the switching transistor M1 is flown through the detection resistor $R_{CS}$. A voltage drop (detection voltage) $V_{CS}$ of the detection resistor $R_{CS}$ is fed back to a current detection (CS) terminal of the control circuit 200r.

A voltage $V_{ZT}$ produced in the auxiliary inductor $L_{ZT}$ is divided by resistors and the divided voltage is input to a ZT terminal of the control circuit 200r.

The control circuit 200r includes a current detection comparator 202, a zero-cross detection circuit 204, a driving logic unit 206 and a driver 208.

FIG. 2 is an operation waveform diagram of the switching converter 100r of FIG. 1.

In an ON period of the switching transistor M1, a current (primary current) $I_P$ flows through the primary coil $L_P$ of a transformer T1, the switching transistor M1 and the detection resistor $R_{CS}$. The primary current $I_P$ increases with time and the detection voltage $V_{CS}$ rises accordingly. The current detection comparator 202 compares the detection voltage $V_{CS}$ with a target voltage $V_{REF}$ set corresponding to the target current value $I_{REF}$. The current detection comparator 202 asserts a peak current detection signal S1 (for example, the signal S1 is at a high level) if the detection voltage $V_{CS}$ reaches the target voltage $V_{REF}$, that is, if the current $I_P$ reaches a peak current $I_{PEAK}$ (=$V_{REF}/R_{CS}$). In the ON period, energy stored in the transformer T1 increases. During the ON period, no current flows through a secondary coil $L_S$ of the transformer T1.

The driving logic unit 206 changes a pulse signal S2 to an OFF level (for example, a low level) corresponding to a turn-off operation of the switching transistor M1 when the peak current detection signal S1 is asserted. The driver 208 turns off the switching transistor M1 in response to the pulse signal S2.

In an OFF period of the switching transistor M1, a current (secondary current) $I_S$ flown through the secondary coil $L_S$ of the transformer T1 decreases with time and a voltage $V_{ZT}$ decreases accordingly. The zero-cross detection circuit 204 compares the voltage $V_{ZT}$ of the auxiliary inductor $L_{ZT}$ with a threshold voltage $V_{ZERO}$ set to about zero. Based on the comparison result, the zero-cross detection circuit 204 detects that the secondary current $I_S$ is zeroed (zero-cross), and asserts a zero-cross detection signal S3.

The driving logic unit 206 changes the pulse signal S2 to an ON level (for example, a high level) corresponding to a turn-on operation of the switching transistor M1 when the zero-cross detection signal S3 is asserted. The driver 208 turns on the switching transistor M1 in response to the pulse signal S2.

The control circuit 200r repeats the above operation. The load current $I_{LED}$ is a current obtained by smoothing the secondary current $I_S$ by means of the smoothing capacitor C1 and is expressed by the following equation (1).

$$I_{LED} = 1/2 \times I_{PEAK} \times T_{OFF}/T \quad (1)$$

Where, $I_{PEAK'}$ is a peak of the secondary current $I_S$ and T is a switching period ($T_{ON}+T_{OFF}$). Equation (1) may be rewritten into the following equation (2). Here, a forward voltage drop of the rectifying diode D1 is ignored.

$$I_{LED} = I_{PEAK}^2 \times L_S/V_{OUT} \quad (2)$$

As can be seen from Equation (2), the driving current $I_{LED}$ depends on the output voltage $V_{OUT}$, that is, a forward voltage of the load 502. That is, the switching converter 100r of FIG. 1 is problematic in that the driving current $I_{LED}$ is varied due to the variation of the forward voltage of the load (e.g., LED string) 502. In addition, it is also problematic that the driving current $I_{LED}$ is affected by a change in the inductance of the secondary coil $L_S$ of the transformer T1.

To solve the aforementioned problems, a method of connecting a resistor for detection of the driving current $I_{LED}$ in series to the load 502, feeding back a voltage drop of the resistor to the control circuit 200r, and controlling the driving current $I_{LED}$ to be equal to a target value has been proposed. However, applications requiring electrical isolation between a primary side and a secondary side need a photo coupler or a shunt regulator in order to feedback a detection voltage of the secondary side to the primary side, which may result in increased costs.

The above problems may also occur in a variety of loads other than the LED string. That is, in any load, if its impedance is varied or fluctuated, a voltage drop (the output voltage $V_{OUT}$) across the load when the same load current flows is changed, which may cause a change in the load current $I_{LED}$.

SUMMARY

The present disclosure provides some embodiments of a switching converter which is capable of reducing variation and fluctuation of a load and supplying a stable driving current to the load.

According to one embodiment of the present disclosure, a control circuit of a flyback type switching converter including a transformer having a primary coil and a secondary coil; a switching transistor connected to the primary coil; and a detection resistor arranged on a path of a current flowing through the switching transistor in an ON period of the switching transistor, includes a current detection comparator configured to compare a detection voltage corresponding to a voltage drop of the detection resistor with a reference voltage and generate a peak current detection signal asserted when the detection voltage reaches the reference voltage; a driving logic unit configured to generate a pulse signal indicating a turn-on/off operation of the switching transistor and transition the pulse signal to an OFF level indicating the turn-off operation of the switching transistor when the peak current detection signal is asserted; a driver configured to drive the switching transistor based on the pulse signal; and a reference voltage setting unit configured to measure time ($T_{RECT}$) for which a current flows through the secondary coil and a switching period (T) of the switching transistor and adjust the reference voltage ($V_{REF}$) according to an equation: $V_{REF}=K\times T/T_{RECT}$ where K is a coefficient.

According to this embodiment, it is possible to stabilize a driving current supplied to the load without monitoring and detecting a current of the secondary coil.

The control circuit may further include a zero-cross detection circuit configured to generate a zero-cross detection signal asserted when a current flowing through the secondary coil of the transformer is zeroed, in an OFF period of the switching transistor. The driving logic unit may change the pulse signal to an ON level indicating the turn-on operation of the switching transistor when the zero-cross detection signal is asserted.

The switching converter may further include an auxiliary inductor coupled to the transformer. The zero-cross detection circuit may generate the zero-cross detection signal based on a voltage across the auxiliary inductor.

The reference voltage setting unit may measure the time ($T_{RECT}$) for which the current flows through the secondary coil and the switching period (T) of the switching transistor based on the peak current detection signal and the zero-cross detection signal.

The reference voltage setting unit may measure the time ($T_{RECT}$) for which the current flows through the secondary coil and the switching period (T) of the switching transistor based on the pulse signal.

The load of the switching converter may include a light emitting device. The reference voltage setting unit may set the coefficient (K) based on a control signal indicating brightness of the light emitting device.

The control circuit may be integrated with a single semiconductor substrate. As used herein, the term "integrated" is intended to include both the case where all elements of a circuit are formed on a semiconductor substrate and the case where main elements of the circuit are integrated on the semiconductor substrate. In addition, some resistors, capacitors and the like for adjustment of a circuit constant may be provided outside the semiconductor substrate.

According to another embodiment of the present disclosure, a switching converter includes the above-described control circuit.

According to another embodiment of the present disclosure, a lighting device includes a light emitting unit including a plurality of light emitting diodes connected in series; a rectification circuit configured to smooth and rectify a general-purpose AC voltage to output a DC voltage; and a switching converter configured to receive the DC voltage from the rectification circuit as an input voltage, the light emitting unit being connected to the switching converter as a load, wherein the switching converter includes the above-described control circuit.

According to another embodiment of the present disclosure, an electronic apparatus includes a liquid crystal panel; and the above-described lighting device, wherein the lighting device is configured as a backlight configured to irradiate a light on a rear side of the liquid crystal panel.

According to another embodiment of the present disclosure, a control method of a flyback type switching converter including a transformer having a primary coil and a secondary coil; a switching transistor connected to the primary coil; and a detection resistor arranged on a path of a current flowing through the switching transistor in an ON period of the switching transistor, includes comparing a detection voltage corresponding to a voltage drop of the detection resistor with a reference voltage and generating a peak current detection signal asserted when the detection voltage reaches the reference voltage; generating a pulse signal indicating a turn-on/off operation of the switching transistor and changing the pulse signal to an OFF level indicating the turn-off operation of the switching transistor when the peak current detection signal is asserted; driving the switching transistor based on the pulse signal; measuring at least one of time ($T_{RECT}$) for which a current flows through the secondary coil and a switching period (T) of the switching transistor; and adjusting the reference voltage ($V_{REF}$) based on at least one of the measured time ($T_{RECT}$) and the measured switching period (T).

Adjusting the reference voltage ($V_{REF}$) may include adjusting the reference voltage ($V_{REF}$) inversely proportional to the measured time ($T_{RECT}$).

Adjusting the reference voltage ($V_{REF}$) may include adjusting the reference voltage ($V_{REF}$) proportional to the measured switching period (T).

Any combinations of the above-described elements or changes of the representations of the present disclosure between methods and apparatuses are effective as embodiments of the present disclosure.

BRIEF DESCRIPTION OF THE DRAWINGS

FIGS. 6A to 6C are exemplary views of the lighting device.

DETAILED DESCRIPTION

Figure 1:
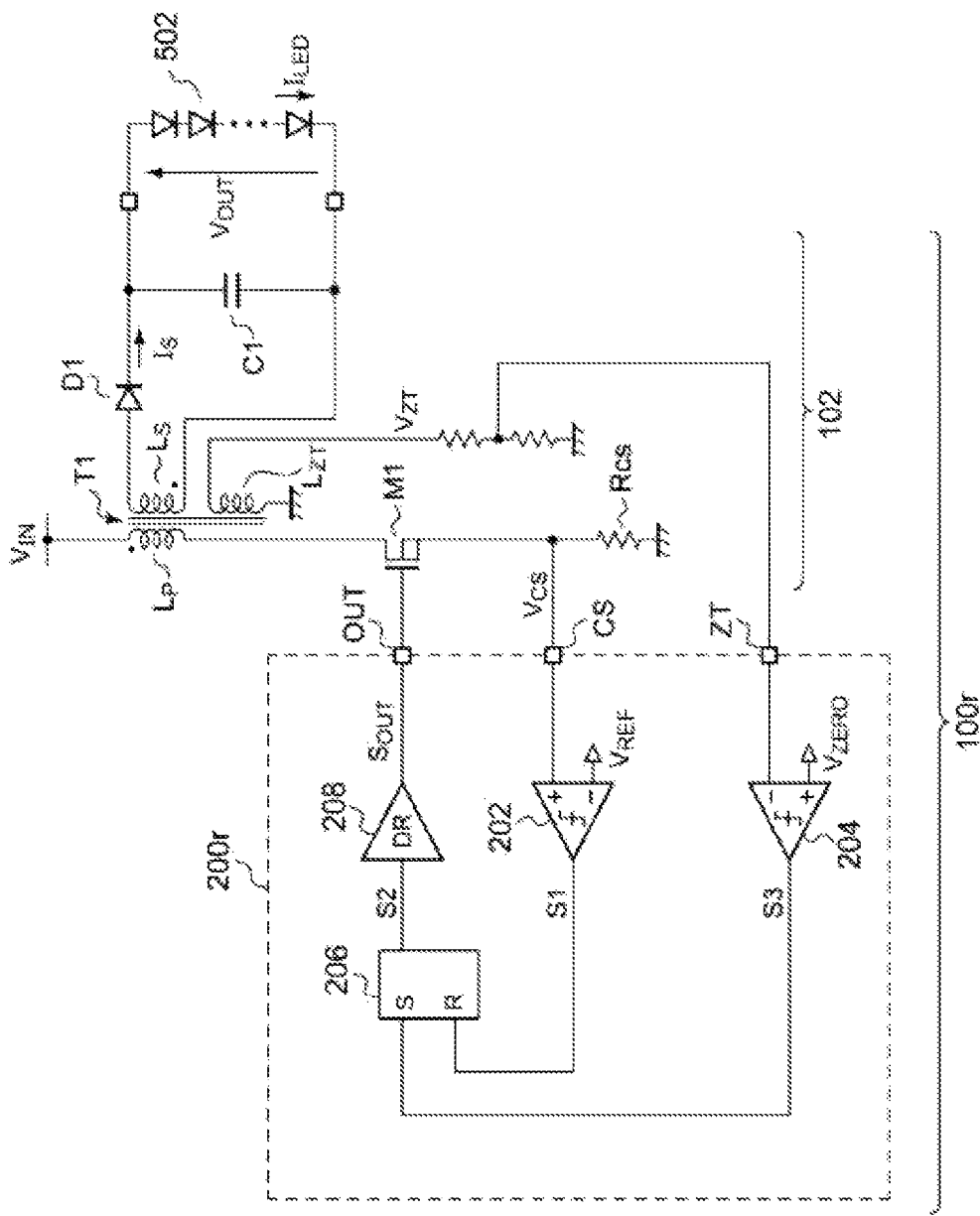
FIG. 1 is a circuit diagram of a flyback type switching converter in the related art.
Figure 2:
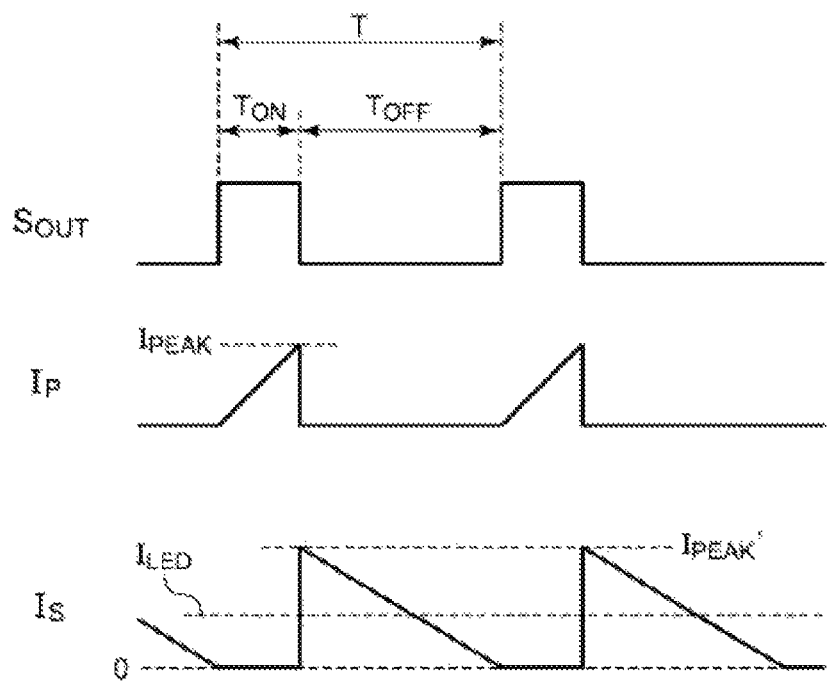
FIG. 2 is an operation waveform diagram of the switching converter of FIG. 1.

Preferred embodiments of the present disclosure will now be described in detail with reference to the drawings. Throughout the drawings, the same or similar elements, members and processes are denoted by the same reference numerals and explanation of which will not be repeated. The disclosed embodiments are provided for the purpose of illustration, not limitation, of the present disclosure and all features and combinations thereof described in the embodiments cannot be necessarily construed to describe the spirit of the present disclosure.

In the specification, the phrase "connection of a member A and a member B" is intended to include direct physical connection of the member A and the member B as well as indirect connection thereof via another member as long as the other member has no substantial effect on the electrical connection of the member A and the member B. Similarly, the phrase "interposition of a member C between a member A and a member B" is intended to include direct connection of the member A and the member C or direct connection of the member B and the member C as well as indirect connection thereof via another member as long as the other member has no substantial effect on the electrical connection of the member A, the member B and the member C.

Figure 3:
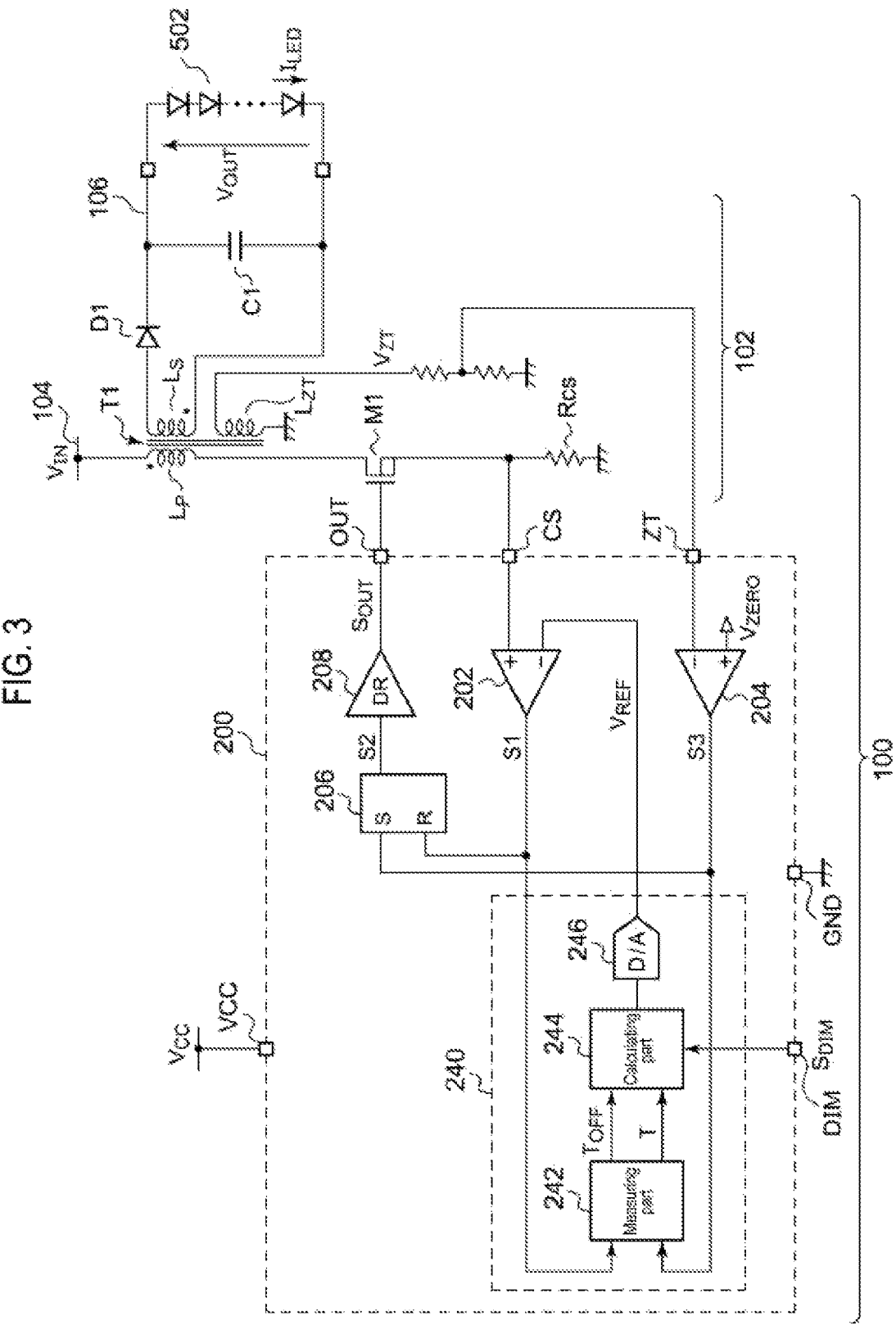
FIG. 3 is a circuit diagram of a switching converter according to an embodiment.

FIG. 3 is a circuit diagram of a switching converter 100 according to an embodiment. The switching converter 100 includes an output circuit 102 and a control circuit 200. As shown in FIG. 3, the switching converter 100 is configured as a flyback type converter and supplies a driving voltage $V_{OUT}$ across a load 502.

The load 502 is a constant current-driven device and the switching converter 100 stabilizes a current flowing through the load 502 to a target value. For example, the load 502 may be a LED string including a plurality of light emitting diodes (LEDs) connected in series. The switching converter 100 stabilizes a current $I_{LED}$ flowing through the load 502 to a target current value $I_{REF}$ depending on the target brightness.

The output circuit 102 includes a transformer T1, a smoothing capacitor C1, a rectifying diode D1, a switching transistor M1 and a detection resistor $R_{CS}$. A primary coil $L_P$ of the transformer T1, the switching transistor M1 and the detection resistor $R_{CS}$ are connected in series between an input line 104 and a ground line. A secondary coil $L_S$ of the transformer T1 and the rectifying diode D1 are connected in series to the load 502 to form a closed loop. Specifically, an anode of the rectifying diode D1 is connected to one end of the secondary coil $L_S$ and a cathode thereof is connected to an output line 106. One end of the smoothing capacitor C1 is connected to the cathode of the rectifying diode D1 and the output line 106 and the other end thereof is connected to the other end of the secondary coil $L_S$.

The control circuit 200 is configured as a functional IC (Integrated Circuit) integrated with a single semiconductor substrate. The control circuit 200 has an output (OUT) terminal, a current detection (CS) terminal, an auxiliary (ZT) terminal, a power (VCC) terminal, a dimming (DIM) terminal and a ground (GND) terminal.

The GND terminal is grounded and the VCC terminal is supplied with a power supply voltage VCC. The OUT terminal is connected to a gate of the switching transistor M1 and the CS terminal is input with a detection voltage $V_{CS}$ indicative of a voltage drop of the detection resistor $R_{CS}$. The DIM terminal is input with a control signal $S_{DIM}$ indicating the brightness of the load 502. The ZT terminal is input with a voltage $V_{ZT}$ indicative of a voltage at one end of an auxiliary coil $L_{ZT}$.

The control circuit 200 includes a current detection comparator 202, a zero-cross detection circuit 204, a driving logic unit 206, a driver 208 and a reference voltage setting unit 240.

The current detection comparator 202 compares the detection voltage $V_{CS}$ with a reference voltage $V_{REF}$ and generates a peak current detection signal S1 based on the comparison result. When the detection voltage $V_{CS}$ reaches the reference voltage $V_{REF}$, the current detection comparator 202 asserts the peak current detection signal S1 (for example, outputs the signal S1 at a high level). In some examples, a mask circuit may be disposed in a subsequent-stage of the zero-cross detection circuit 204. The mask circuit is configured to invalidate the comparison result of the current detection comparator 202, that is, the peak current detection signal S1, during a mask time $T_{MSK}$ from turn-on time of the switching transistor M1. The mask circuit may suppress noise or an effect of the noise.

The zero-cross detection circuit 204 generates a zero-cross detection signal S3 asserted when a current $I_S$ flowing through the secondary coil $L_S$ is zeroed, in an OFF period of the switching transistor M1. For example, the zero-cross detection circuit 204 includes a comparator for comparing the voltage $V_{ZT}$ of the ZT terminal with a predetermined threshold voltage $V_{ZERO}$ and may assert the zero-cross detection signal S3 when the voltage $V_{ZT}$ becomes lower than the threshold voltage $V_{ZERO}$.

The driving logic unit 206 generates a pulse signal S2 indicating a turn-on/off operation of the switching transistor M1. When the peak current detection signal S1 is asserted, the driving logic unit 206 changes the pulse signal S2 to an OFF level (for example, a low level) that indicates the turn-off operation of the switching transistor M1. In addition, when the zero-cross detection signal S3 is asserted, the driving logic unit 206 changes the pulse signal S2 to an ON level (for example, a high level) that indicates the turn-on operation of the switching transistor M1.

For example, the driving logic unit 206 may be configured as a RS flip-flop having a set terminal input with the zero-cross detection signal S3 and a reset terminal input with the peak current detection signal S1. The configuration of the driving logic unit 206 has been described above, but the present disclosure is not limited thereto. The driver 208 drives the switching transistor M1 based on the pulse signal S2.

The reference voltage setting unit 240 generates the reference voltage $V_{REF}$ based on the control signal $S_{DIM}$. The reference voltage setting unit 240 measures a time $T_{RECT}$ for which the secondary current $I_S$ flows through the secondary coil $L_S$ (hereinafter referred to as a rectification time) and a switching period T of the switching transistor M1. The reference voltage setting unit 240 sets the reference voltage $V_{REF}$ according to the equation: $V_{REF}=K \times T/T_{RECT}$. Where, K is a real number coefficient. For example, K may be $I_{REF}/R_{CS}$. Here, $I_{REF}$ is a target current value of the load current $I_{LED}$ determined based on the control signal $S_{DIM}$.

$$V_{REF}=I_{REF}/R_{CS} \times T/T_{RECT} \qquad (3)$$

The reference voltage setting unit 240 includes a measuring part 242, a calculating part 244 and a D/A converter 246. The measuring part 242 measures the rectification time $T_{RECT}$ and the switching period T. For example, the measuring part 242 may measure the rectification time $T_{RECT}$ and the switching period T based on the peak current detection signal S1 and the zero-cross detection signal S3. For example, the measuring part 242 may measure a time taken from an assertion of the peak current detection signal S1 to the next assertion thereof, as the switching period T, and may measure a time taken until the zero-cross detection signal S3 is asserted after the peak current detection signal S1 is asserted, as the rectification time $T_{RECT}$.

The calculating part 244 calculates the reference voltage $V_{REF}$ according to Equation (3) and outputs a calculated value $D_{REF}$. The D/A converter 246 converts the digital calculated value $D_{REF}$ into the reference voltage $V_{REF}$.

Figure 4:
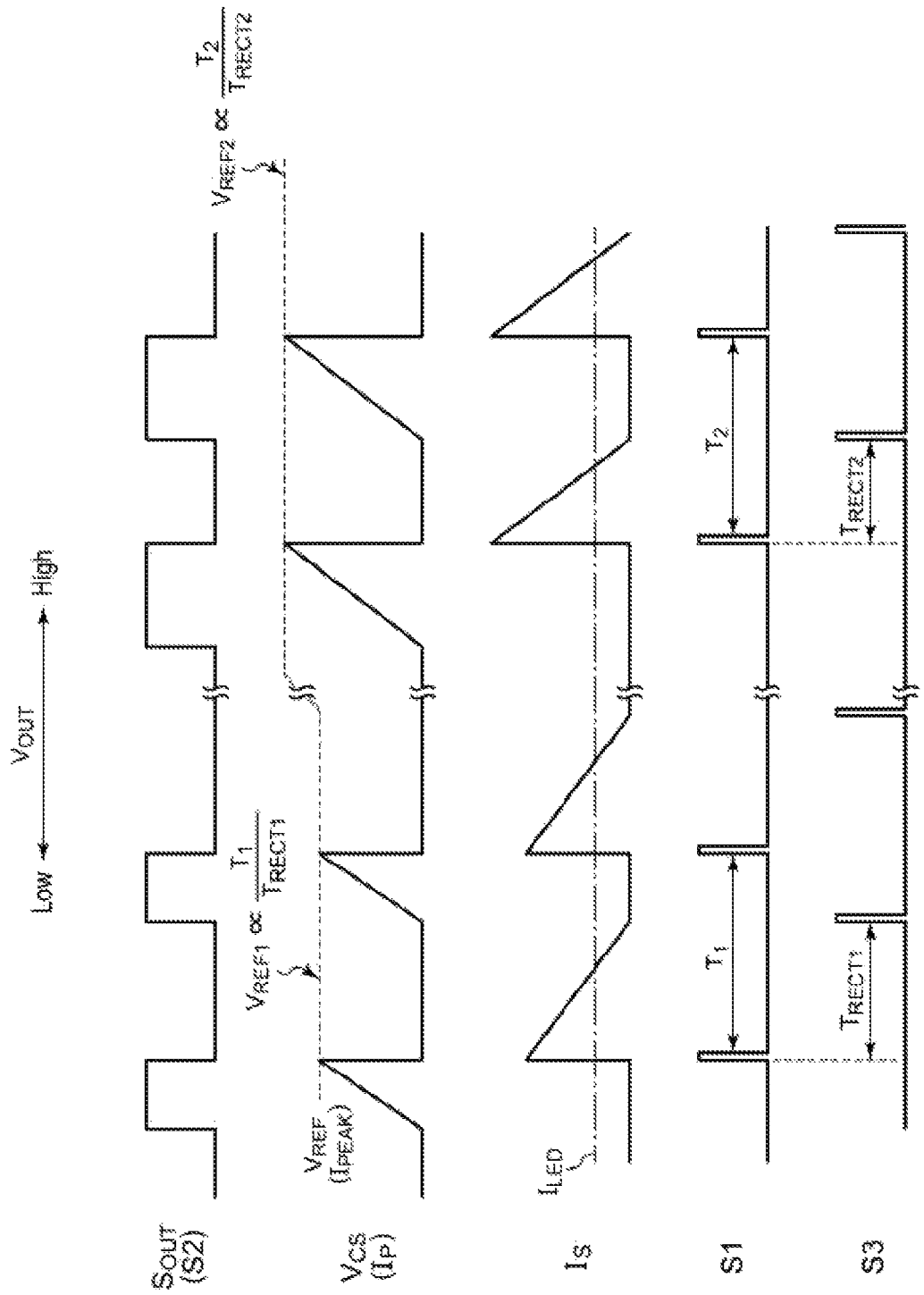
FIG. 4 is an operation waveform diagram of the switching converter of FIG. 3.

The configuration of the switching converter 100 has been described above. FIG. 4 is an operation waveform diagram of the switching converter 100 of FIG. 3.

In a high level period of an output $S_{OUT}$ of the driver 208, the switching transistor M1 is turned on and a current $I_P$ of the primary coil $L_P$ increases with time, which in turn, increases the detection voltage $V_{CS}$ with time. When the detection voltage $V_{CS}$ reaches the reference voltage $V_{REF}$ generated by the reference voltage setting unit 240, the peak current detection signal S1 is asserted and the pulse signal S2 is changed to a low level.

When the pulse signal S2 is changed to the low level and the switching transistor M1 is turned off, the secondary current $I_S$ begins to flow through the secondary coil $L_S$ at the secondary side. The secondary current $I_S$ has the maximum value immediately after the switching transistor M1 is turned off. Thereafter, the secondary current $I_S$ decreases with time and the auxiliary voltage $V_{ZT}$ decreases accordingly. When the secondary current $I_S$ is substantially zeroed, the zero-cross detection signal S3 is asserted and the pulse signal S2 is changed to a high level accordingly.

The control circuit 200 supplies the driving current $I_{LED}$ to the load 502 by repeating the above operation. During this switching operation, the switching period T and the rectification time $T_{RECT}$ of the switching transistor M1 are measured by the reference voltage setting unit 240 and the reference voltage $V_{REF}$ is determined by the measured switching period T and rectification time $T_{RECT}$ according to Equation (3).

As shown in FIG. 4, as the output voltage $V_{OUT}$ of the switching converter 100, that is, a forward voltage of the load 502, increases, a slope of the secondary current $I_S$ increases in the OFF period of the switching transistor M1 and, accordingly, a ratio of the switching period T to the rectification time $T_{RECT}$ ($T/T_{RECT}$) increases. In accordance with Equation (3), the reference voltage $V_{REF}$ and the peak current $I_{PEAK}$ of the primary current $I_P$ increases as the ratio $T/T_{RECT}$ increases. Consequently, the load current $I_{FED}$ obtained by smoothing the secondary current $I_S$ can be maintained at a constant level.

With this switching converter 100, without monitoring the secondary current $I_S$ of the transformer T1, the load current $I_{LED}$ can be stabilized to a current value based on the control signal $S_{DIM}$. In addition, it is possible to suppress an increase in costs without requiring expensive components such as a photo coupler or a shunt regulator.

Figure 5:
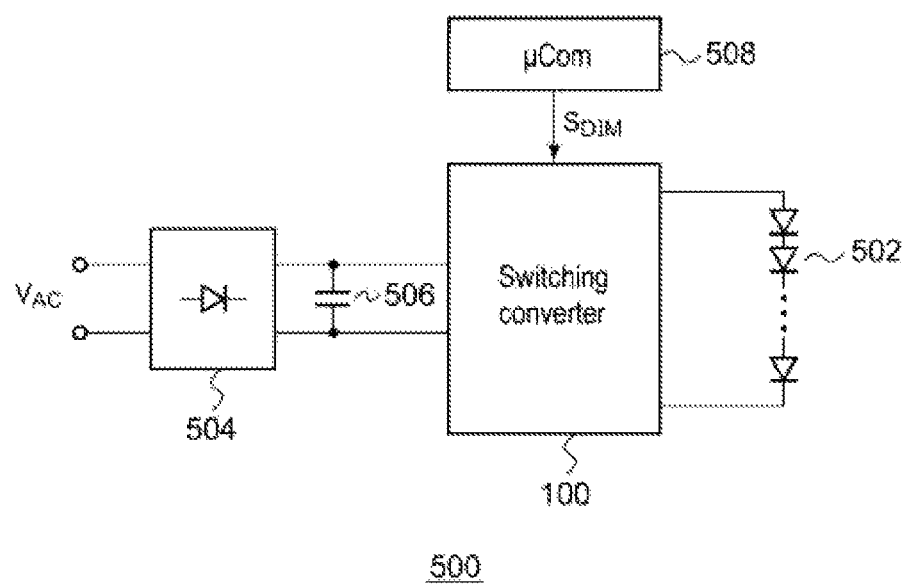
FIG. 5 is a block diagram of a lighting device including the switching converter of FIG. 3.

Subsequently, applications of the switching converter 100 will be described. FIG. 5 is a block diagram of a lighting device 500 including the switching converter 100 of FIG. 3. The lighting device 500 includes a rectification circuit 504, a smoothing capacitor 506 and a microcomputer 508 in addition to a light emitting unit as the load 502 and the switching converter 100. The rectification circuit 504 and the smoothing capacitor 506 convert a general-purpose AC voltage $V_{AC}$ into a DC voltage $V_{DC}$ by rectifying and smoothing the AC voltage $V_{AC}$. The microcomputer 508 generates a control signal $S_{DIM}$ indicating the brightness of the load 502. The switching converter 100 receives the DC voltage $V_{DC}$ as an input voltage $V_{IN}$ and supplies a driving current $L_{ED}$ based on the control signal $S_{DIM}$ to the load 502.

Figure 6A:
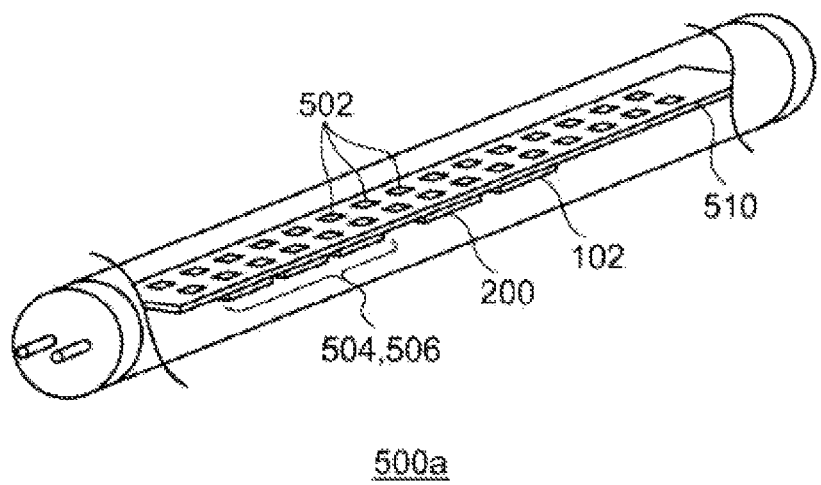
Figure 6B:
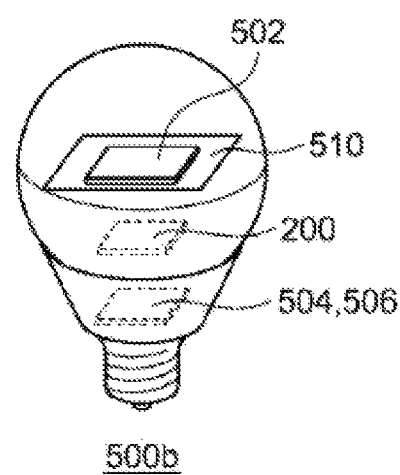

FIGS. 6A to 6C are exemplary views of the lighting device 500. All elements are not shown but some are omitted in FIGS. 6A to 6C. A lighting device 500a is a direct tube type LED illuminator as shown in FIG. 6A. A plurality of LED elements constituting a LED string as the load 502 is laid on a board 510. The rectification circuit 504, the control circuit 200 and the output circuit 102 are mounted on the board 510.

A lighting device 500b is a bulb type LED illuminator as shown in FIG. 6B. A LED module as the load 502 is mounted on a board 510. The rectification circuit 504 and the control circuit 200 are mounted inside a housing of the lighting device 500b.

As shown in FIG. 6C, a lighting device 500c is a backlight equipped in a liquid crystal display (LCD) apparatus 600. The lighting device 500c irradiates a light on a rear side of a liquid crystal panel 602.

The lighting device 500 may be used in a ceiling light. As described above, the lighting device 500 of FIG. 5 may be utilized in various applications.

The present disclosure is not limited to the above embodiments since these are illustrative only. It should be understood by those skilled in the art that various modifications to combinations of elements or processes may be made and such modifications fall within the scope of the present disclosure. Such modifications will be described below.

Modification 1

Although it has been illustrated in the above embodiments that the rectification time $T_{RECT}$ and the switching period T are measured based on the peak current detection signal S1 and the zero-cross detection signal S3 and the reference voltage $V_{REF}$ is adjusted based on the measurements, the present disclosure is not limited thereto. Instead, the following process may be performed.

As described in the above embodiments, in the modulation scheme of detecting the zero-cross of the secondary current $I_S$, when the bottom of a down slope of the waveform of the secondary current $I_S$ is zeroed, the pulse signal S2 is immediately changed to an ON level (high level) and the switching transistor M1 is turned on. Accordingly, the length of time for which the pulse signal S2 has a low level, that is, OFF time of the switching transistor M1, is equal to the length of the rectification time $T_{RECT}$ for which the secondary current flows (which is referred to as a critical mode). Therefore, the measuring part 242 may measure the rectification time $T_{RECT}$ and the switching period T Based on the pulse signal S2 or the switching pulse $S_{OUT}$.

Modification 2

Figure 7:
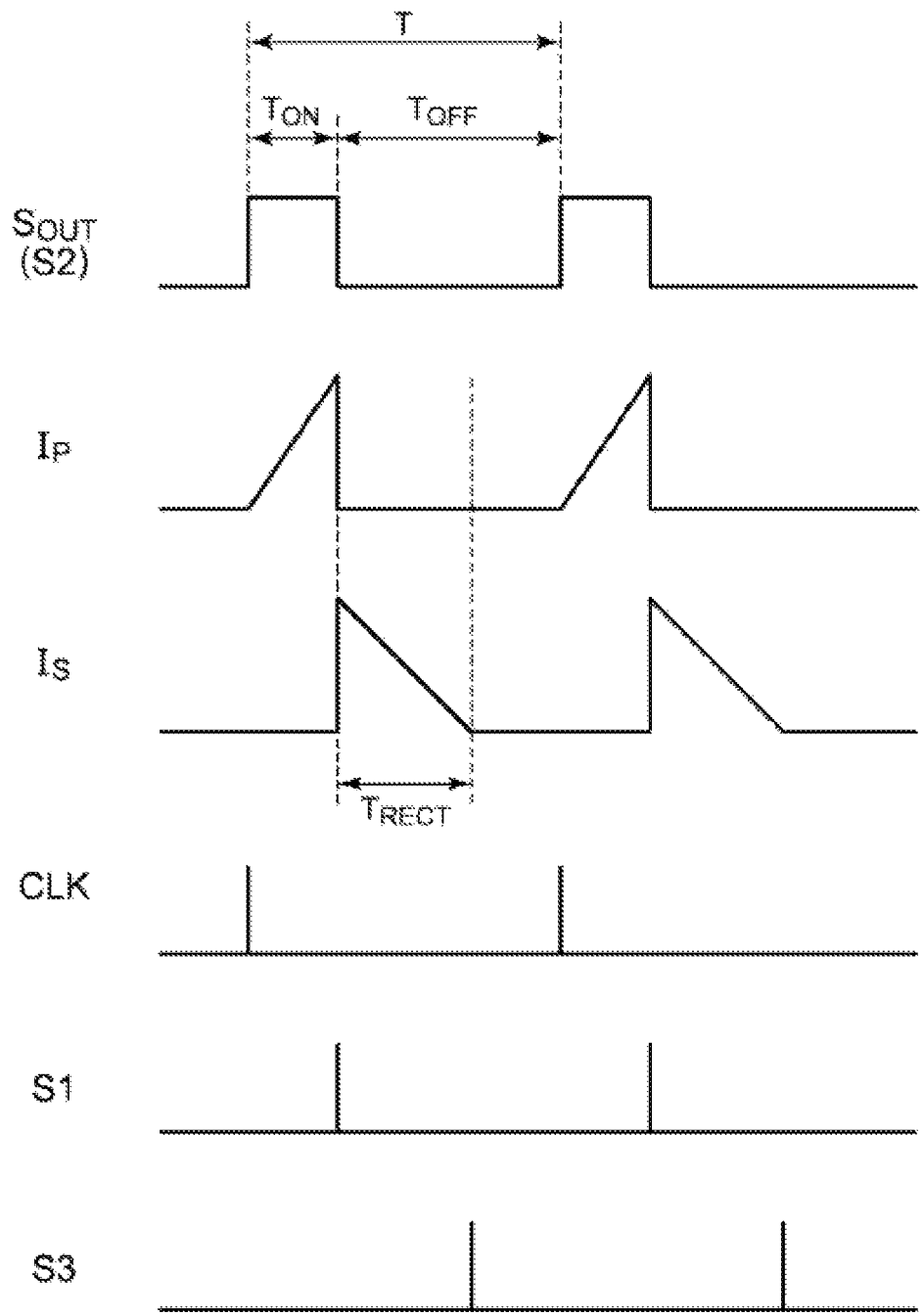
FIG. 7 is an operation waveform diagram of a switching converter operating in a discontinuous mode.

The switching converter 100 may operate in a discontinuous mode instead of the critical mode. FIG. 7 is an operation waveform diagram of the switching converter 100 operating in a discontinuous mode. For example, the discontinuous mode is realized by inputting a clock signal CLK having a predetermined cycle T, instead of the zero-cross detection signal S3, to the set terminal of the RS flip-flop of the driving logic unit 206.

In the discontinuous mode, the OFF time of the switching transistor M1 is not equal to the rectification time $T_{RECT}$. In such a case, the rectification time $T_{RECT}$ may be measured based on the zero-cross detection signal S3 which is generated by the zero-cross detection circuit 204.

Modification 3

Although it has been illustrated in the above embodiments that both the switching period T and the rectification time $T_{RECT}$ are measured, the present disclosure is not limited thereto. For example, in a situation where one of them is regarded as constant, only the other may be measured and used in calculating the reference voltage $V_{REF}$. More specifically, in the discontinuous mode using the clock signal CLK of an oscillator as shown in FIG. 7, since the switching period T is known, only the rectification time $T_{RECT}$ may be measured.

Modification 4

The modulation scheme of the control circuit 200 is not limited to those described in the above embodiments. For example, it has been illustrated in the above embodiments that the switching converter is operated in a boundary between a continuous mode and a discontinuous mode, that is, in the critical mode where the bottom of an inductor current is zeroed. To this end, the zero-cross of the auxiliary inductor LZT is detected to detect that energy stored in the secondary coil $L_S$ of the output circuit 102 is zeroed. However, other schemes may be employed. As an alternative, a modulator operated in the continuous mode or the discontinuous mode instead of the critical mode may be employed. For example, a scheme of turning on the switching transistor M1 every predetermined period may be employed. In addition, a scheme using an error amplifier for amplifying an error between an output voltage or an output current, and a target value may be employed.

Modification 5

Although it has been illustrated in the above embodiments that the load 502 is a LED string, the type of the load is not particularly limited.

Modification 6

In the above embodiments, logical values of the high level and the low level for use in logic circuits may be changed, for example by appropriately inverting these levels by means of an inverter or the like.

According to the present disclosure in some embodiments, it is possible to stabilize a load current. In some embodiments, it is possible to stabilize the load current without monitoring and detecting a current of the secondary coil.

While certain embodiments have been described, these embodiments have been presented by way of example only, and are not intended to limit the scope of the disclosures. Indeed, the novel methods and apparatuses described herein may be embodied in a variety of other forms; furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A control circuit of a flyback type switching converter including:
   a transformer having a primary coil and a secondary coil;
   a switching transistor connected to the primary coil; and
   a detection resistor arranged on a path of a current flowing through the switching transistor in an ON period of the switching transistor, the control circuit comprising:
   a current detection comparator configured to compare a detection voltage corresponding to a voltage drop of the detection resistor with a reference voltage and generate a peak current detection signal asserted when the detection voltage reaches the reference voltage;
   a driving logic unit configured to generate a pulse signal indicating a turn-on/off operation of the switching transistor and change the pulse signal to an OFF level indicating the turn-off operation of the switching transistor when the peak current detection signal is asserted;
   a driver configured to drive the switching transistor based on the pulse signal; and
   a reference voltage setting unit configured to measure time ($T_{RECT}$) for which a current flows through the secondary coil and a switching period (T) of the switching transistor and adjust the reference voltage ($V_{REF}$) according to an equation: $V_{REF}=K \times T/T_{RECT}$ where K is a coefficient.

2. The control circuit of claim 1, further comprising a zero-cross detection circuit configured to generate a zero-cross detection signal asserted when a current flowing through the secondary coil of the transformer is zeroed, in an OFF period of the switching transistor,
   wherein the driving logic unit is configured to change the pulse signal to an ON level indicating the turn-on operation of the switching transistor when the zero-cross detection signal is asserted.

3. The control circuit of claim 2, wherein the switching converter further includes an auxiliary inductor coupled to the transformer, and
   wherein the zero-cross detection circuit is configured to generate the zero-cross detection signal based on a voltage across the auxiliary inductor.

4. The control circuit of claim 2, wherein the reference voltage setting unit measures the time ($T_{RECT}$) for which the current flows through the secondary coil and the switching period (T) of the switching transistor based on the peak current detection signal and the zero-cross detection signal.

5. The control circuit of claim 1, wherein the reference voltage setting unit measures the time ($T_{RECT}$) for which the current flows through the secondary coil and the switching period (T) of the switching transistor based on the pulse signal.

6. The control circuit of claim 1, wherein a load of the switching converter includes a light emitting device, and
   wherein the reference voltage setting unit sets the coefficient (K) based on a control signal indicating brightness of the light emitting device.

7. The control circuit of claim 1, wherein the control circuit is integrated with a single semiconductor substrate.

8. A switching converter comprising a control circuit of claim 1.

9. A lighting device comprising:
   a light emitting unit including a plurality of light emitting diodes connected in series;
   a rectification circuit configured to smooth and rectify a general-purpose AC voltage to output a DC voltage; and
   a switching converter configured to receive the DC voltage from the rectification circuit as an input voltage, the light emitting unit being connected to the switching converter as a load,
   wherein the switching converter includes a control circuit of claim 1.

10. An electronic apparatus comprising:
    a liquid crystal panel; and
    a lighting device of claim 9, wherein the lighting device is configured as a backlight configured to irradiate a light on a rear side of the liquid crystal panel.

11. A control method of a flyback type switching converter including a transformer having a primary coil and a secondary coil; a switching transistor connected to the primary coil; and a detection resistor arranged on a path of a current flowing through the switching transistor in an ON period of the switching transistor, the control method comprising:
    comparing a detection voltage corresponding to a voltage drop of the detection resistor with a reference voltage and generating a peak current detection signal asserted when the detection voltage reaches the reference voltage;
    generating a pulse signal indicating a turn-on/off operation of the switching transistor and changing the pulse signal to an OFF level indicating the turn-off operation of the switching transistor when the peak current detection signal is asserted;

driving the switching transistor based on the pulse signal;

measuring at least one of time ($T_{RECT}$) for which a current flows through the secondary coil and a switching period (T) of the switching transistor; and adjusting the reference voltage ($V_{REF}$) based on at least one of the measured time ($T_{RECT}$) and the measured switching period (T).

12. The control method of claim 11, wherein the adjusting the reference voltage ($V_{REF}$) includes adjusting the reference voltage ($V_{REF}$) inversely proportional to the measured time ($T_{RECT}$).

13. The control method of claim 11, wherein the adjusting the reference voltage ($V_{REF}$) includes adjusting the reference voltage ($V_{REF}$) proportional to the measured switching period (T).

* * * * *